United States Patent Office 3,705,940
Patented Dec. 12, 1972

3,705,940
SILICIC ACID-CONTAINING DENTIFRICE
Hedwig Kirchgassner, Frankfurt am Main, Germany, assignor to Deutsche Gold- und Silber-Scheideanstalt vormals Roessler, Frankfurt am Main, Germany
No Drawing. Filed Feb. 7, 1969, Ser. No. 797,710
Int. Cl. A61k 7/16
U.S. Cl. 424—49       9 Claims

ABSTRACT OF THE DISCLOSURE

A dentifrice comprises a suspension in water, glycerine or a combination of both of (a) a hydrophobic silicic acid obtained by a pyrogenic process and (b) paraffin oil or a vegetable oil or vegetable fat or mixture of these oils and fats. The dentifrice may also include finely dispersed hydrophilic silicic acid or precipitated silicic acid as a thickener and polish.

BACKGROUND OF THE INVENTION

The present invention relates to a dentifrice such as are used in dental hygiene and for dental cleaning.

The modern art of composing dentifrices in general tries to avoid damage to the tooth enamel or gum in spite of a high cleaning power. Numerous methods of treatment and compositions were developed to solve this problem. The compositions usually replaced the abrasives by soaps or salts or tried to diminish their abrasive effect by adding increased amounts of swelling agents, for instance by adding colloidal kaolin, silica gel or pyrogenic highly dispersed silicic acid which latter is known under the trade name "Aerosil."

The use of the pyrogenic highly dispersed silicic acid referred to herein simply as "pyr. silicic acid" is not novel for toothpastes, and has in particular been successful as a thickening agent. The pyr. silicic acid in toothpaste shows a strong water-adsorptive power because of the extreme fineness of the particles and the large surface area. It can therefore be used as a second binder along with carboxymethyl-cellulose, other water-soluble celluose derivatives or tragacanth.

Unfortunately, the replacement of the abrasives by other materials sometimes involves other drawbacks, due to the action of these materials, such as soaps and fatty alcohol sulfonates, on the gums. The favorable effects of these additives may even be offset completely since the inclusion of swelling agents, particularly of pyr. silicic acid, is only to a limited amount possible because of their thickening effect. Thus, it does not help that pyr. silicic acid in larger amounts may forestall the undesirable action of non-abrasive materials which, however, have a strong cleaning action.

It is therefore an object of the present invention to provide a dentifrice in the form of a suspension in water or glycerine or both, and possibly including ethyl alcohol in the suspension medium, which dentifrice comprises the necessary amount of polish, thickener, particularly finely dispersed pyr. silicic acid, binder, foaming and wetting agent, flavoring agent, lubricant and a specific additive of all cosmetics, but which in spite of the high cleaning power has no abrasive effect and in addition has a generally favorable action on the gums.

SUMMARY OF THE INVENTION

This object is accomplished by a dentifrice in the form of a suspension in water or glycerine or a combination of both of (a) a fine particle size hydrophobic silicic acid obtained by a pyrogenic process and (b) a compound selected from the group consisting of paraffin oil, a vegetable oil, a vegetable fat, or a mixture of these oils and fats.

The dentifrice may include finely dispersed hydrophilic silicic acid or precipitated silicic acid as a thickener and polish.

DESCRIPTION OF THE PREFERRED EMBODIMENTS

The invention is based on the surprising discovery that food particles which are stuck between the teeth and the gums and have a tendency to cause bad breath by reaction with the saliva, can be removed to a very high degree by a paste which consists of an oily or fatty emulsion and contains a finely dispersed hydrophobic silicic acid that has been obtained in a pyrogenic process. This applies in particular to food particles which are soluble in fat or can be emulsified in the presence of fats. The dentifrices existing heretofore could accomplish this only inadequately and the damaging effects of the reaction products derived from food particles on the teeth and the gums could not be completely eliminated. The simultaneous addition of oily or fatty components which may furthermore be enriched with fat-dissolving vitamins or may include a certain amount of essential fatty acids permits at the same time performing a curative or restorative action on the gums.

The addition of fats or fat-like substances in combination with hydrophobic silicic acid in addition substantially increases the creamy consistency of the paste. A composition of this type is free of abrasive effects because of the lubricating action of the emulsion while it has a high cleaning action.

The terms "binding agent," "swelling agent" and "thickener" are quite broad and include, for instance, any of the following:

(1) pyrogenic silicic acid (hydrophobic);
(2) pyrogenic silicic acid (hydrophilic);
(3) precipitated, organically modified silicic acid;
(4) CMC, methyl cellulose, tragacanth, alginate, carraghee.

In a tooth paste on an oil-in-water base, the "Aerosil"-silicic acid is effective not only as a stabilizer but as an emulsifier. The swelling agents listed at (4) above are likewise useful as emulsifiers for oil-in-water emulsions.

Water-in-oil emulsions are preferably formed in case of toothpastes with hydrophobic silicic acid as the filler. By broader selection of the oil-soluble emulsifier, such as cholesterol or lecithin, stable water-in-oil emulsions are obtainable.

The preferred oil is paraffin oil. However, other oils that could be used are the following: purcellin oil, sunflower oil, olive oil, peanut oil, wheat germ oil, corn oil.

The highly dispersed hydrophobic silicic acid employed in the context of the invention is preferably a pure silicon dioxide which gains its hydrophobic properties from chemically attached methyl groups. Preferably, its mean primary particle size is between 10 and 13 m$\mu$, its specific surface (determined by the BET-Method) is between 50 and 200 m.$^2$/g., its carbon content is about 1.1±0.2%, and its pH (in water at a 4% concentration) is between 3.6 and 4.0.

These pyrogenic hydrophobic silicic acids have been described in greater detail in the British Pats. Nos. 1,031,-764 and 1,110,331. Specific reference is also made to the disclosure of the co-pending U.S. application Ser. No. 268,302, which was filed on Mar. 27, 1963, now abandoned.

The use of this hydrophobic silicic acid improves the removal of the fatty food particles or odor-causing materials beyond the action due to the oil component because the chemically attached groups of the SiO$_2$ base molecule cause adsorption of these particles and materials in the hydrophobic silicic acid.

As a thickener, it is preferred to employ finely dispersed pyrogenic silicic acid, and more particularly a product which has a particle size of the primary particles between 3 and 50 m$\mu$, preferably between 4 and 20 m$\mu$, a specific surface (BET) between 150 and 500 m.$^2$/g., preferably between 150 and 200 M.$^2$/g., and has a pH between 3.5 and 4.6.

These pyrogenic non-hydrophobic silicic acids have been disclosed in British Pats. Nos. 1,003,957 and 752,654, as well as in the co-pending U.S. application Ser. No. 189,236 filed Apr. 17, 1962, now abandoned.

The contents of the two U.S. applications are incorporated herein by reference.

If a precipitated silicic acid is used in addition to the pyr. hydrophobic silicic acid, it may, for instance, be a slicic acid which is precipitated in the presence of water-soluble organc polymers and which may also be modified by organic substituents. The preferred product has a primary particle size between 10 and 30 m$\mu$, a specific surface (BET) between 100 and 200 m.$^2$/g., and a ph value between about 6 and 7.

The making and composition of the precipitated silicic acid is further described in U.S. Pat. No. 3,235,331.

The dentifrice of the invention results in a dental and cleaning agent of substantially improved properties. The lattice-forming chain structure particularly of the pyrogenic silicic acid causes the finished toothpaste to have a rich consistency in spite of a high content of foaming agent. This is contrary to the general experience, where large amounts of foaming agent usually result in a liquefying of the paste. By adding the pyr. hydrophobic silicic acid, it is also possible to incorporate in the dentifrice larger amounts of oils or fats. This, again, permits reducing the amount of glycerine or other humidifying agents such as sorbitol. The paste will retain a desirable bright apperance even after a long storage time and in spite of the reduction of humidifying agents. It is also broadly possible to add acidic, medical additives or additives of oral hygiene to the paste without apprehension of undesirable reactions, since the pyrogenic silicic acids are distinguished by an excellent chemical compatibility.

A further advantage of the use of hydrophobic pyr. silicic acid in combination with fatty materials resides in the fact that on the one hand the subjective astringent sensation in the mouth is largely concealed while astringent action of the pyr. silicic acid is actually fully effective. The presence of the hydrophilic SiO$_2$ because of its high adsorptive power also causes the removal of water-soluble residues that may accumulate between the teeth with greater speed and greater ease.

The following examples will illustrate the invention. All percentages are by weight. Each example clearly indicates the specific compositions, since the manner of making is the same in all cases and will be described further down:

EXAMPLE 1

| | Percent |
|---|---|
| Carboxymethylcellulose | 1.0 |
| Water | 71.3 |
| Hydroxybenzoic acid methylester | 0.15 |
| Saccharin | 0.05 |
| Paraffin oil | 15.0 |
| Pyr. hydrophobic SiO$_2$ | 9.5 |
| Aromatic oil | 1.0 |
| Foaming agent: 85 to 88% sodiumlaurylsulfate | 2.0 | pH=5.1; abrasion=0.75 mg.

EXAMPLE 2

| | Percent |
|---|---|
| Carboxymethylcellulose | 1.0 |
| Water | 70.8 |
| Hydroxybenzoic acid methylester | 0.15 |
| Saccharin | 0.05 |

Example 2—Continued

| | Percent |
|---|---|
| Pyr. SiO$_2$ | 1.0 |
| Paraffin oil | 15.0 |
| Pyr. hydrophobic SiO$_2$ | 9.0 |
| Aromatic oil | 1.0 |
| Foaming agent: 85 to 88% sodiumlaurylsulfate | 2.0 | pH=4.8; abrasion=0.85 mg.

EXAMPLE 3

| | Percent |
|---|---|
| Carboxymethylcellulose | 1.0 |
| Water | 70.0 |
| Hydroxybenzoic acid methylester | 0.15 |
| Saccharin | 0.05 |
| Pyr. SiO$_2$ | 2.0 |
| Paraffin oil | 15.8 |
| Pyr. hydrophobic SiO$_2$ | 8.0 |
| Aromatic oil | 1.0 |
| Foaming agent: 85 to 88% sodiumlaurylsulfate | 2.0 | pH=4.85; abrasion=0.22 mg.

EXAMPLE 4

| | Percent |
|---|---|
| Carboxymethylcellulose | 1.0 |
| Water | 71.8 |
| Hydroxybenzoic acid methylester | 0.15 |
| Saccharin | 0.05 |
| Pyr. SiO$_2$ | 3.0 |
| Olive oil | 15.0 |
| Pyr. hydrophobic SiO$_2$ | 6.0 |
| Aromatic oil | 1.0 |
| Foaming agent (as above) | 2.0 | pH=4.85; abrasion=0.75 mg.

EXAMPLE 5

| | Percent |
|---|---|
| Carboxymethylcellulose | 1.0 |
| Water | 69.3 |
| Hydroxybenzoic acid methylester | 0.15 |
| Saccharin | 0.05 |
| Paraffin oil | 15.0 |
| Pyr. hydrophobic SiO$_2$ | 6.0 |
| Precipitated SiO$_2$ (pH=6; BET-surface 240 m.$^2$/g.) | 5.5 |
| Aromatic oil | 1.0 |
| Foaming agent | 2.0 | pH=5.0; abrasion=1.25 mg.

The making of the formulations set out in Examples 1 to 5 preferably was effected as follows:

The binder, preferably carboxymethylcellulose, was caused to swell with the calculated amount of water. An antiseptic agent and sweetener was then added to the slurry. After the swelling process had been terminated, the paraffin oil or olive oil was introduced and the mixture was vigorously stirred until a smooth oil-in-water emulsion was achieved. The hydrophobic silicic acid or, where used, the other types of silicic acid, were then added and stirred into the mixture until the entire mass had a smooth, uniform appearance. Ultimately, the aromatic oil and the foaming agent were added, with only very slight stirring.

In determining the amount of water for swelling the CMC, due consideration must be given to the water in the solution of the foaming agent. To accomplish a further homogenizing, the still liquid toothpaste mass was passed through a three-roll mill, although this step is not indispensable.

By employing a water-in-oil emulsion as the base of a toothpaste containing hydrophobic SiO$_2$, one accomplishes also that the paste can better be subjected to further processing and is easier to use, and at the same time has the cleaning, that is, emulsifying effect, as pointed out, on the food particles and odor-causing particles of a fatty nature which have accumulated between the teeth.

What is claimed as new and desired to be protected by Letters Patent is set forth in the appended claims.

I claim:

1. A dentrifrice for oral hygiene and dental cleaning purposes, said dentifrice comprising an aqueous suspension of (a) finely dispersed silicic acid in amount from about 9 to 11.5% by weight of the total composition and including in that amount from about 6 to about 9.5% by weight of the total composition of finely dispersed pyrogenic hydrophobic silicic acid and (b) a compound selected from the group consisting of paraffin oil, a vegetable oil, a vegetable fat, or a mixture of these oils and said fat.

2. The dentifrice of claim 1, wherein the hydrophobic silicic acid consists of pure $SiO_2$ including chemically attached methyl groups, and wherein the mean primary particle size of the acid is between 10 and 30 m$\mu$, its specific BET-surface is between 50 and 200 m.$^2$/g., its carbon content is about 1.1±0.2%, and its pH (in a 4% concentration in water) is between 3.6 and 4.0.

3. The dentifrice of claim 1, which includes foaming and wetting agents, flavoring agents, and a lubricant.

4. The dentifrice of claim 1, which includes carboxymethylcellulose as a binder in addition to said hydrophobic silicic acd.

5. The dentifrice of claim 1, wherein the suspension medium includes ethyl alcohol.

6. The dentifrice of claim 1, which in said amount of silicic acid further includes a finely dispersed precipitated silicic acid as a thickener and polish in an amount of about 5.5% by weight.

7. The dentifrice of claim 1, which in said amount of silicic acid further includes finely dispersed pure hydrophilic silicic acid as a thickener and polish in an amount of about 1 to 3% by weight of the total composition.

8. The dentifrice of claim 2, wherein the hydrophilic silicic acid has a primary particle size between 3 and 50 m$\mu$, a specific BET-surface between 150 and 500 m.$^2$/g., and a pH between 3.5 and 4.6.

9. The dentifrice of claim 7, wherein the hydrophilic acid has a primary partcile size between 4 and 20 m$\mu$, and a specific BET-surface between 150 and 200 m.$^2$/g. and a pH between 3.5 and 4.6.

References Cited

UNITED STATES PATENTS 2,994,642   8/1961   Bossard _____ 424—49

RICHARD L. HUFF, Primary Examiner